United States Patent [19]

Livingston

[11] 4,077,194

[45] Mar. 7, 1978

[54] APPARATUS FOR COLLECTING OBJECTS FROM A SURFACE

[76] Inventor: Almer K. Livingston, Church St., Smithville, Ga. 31787

[21] Appl. No.: 680,869

[22] Filed: Apr. 27, 1976

[51] Int. Cl.² ............................................ A01D 51/00
[52] U.S. Cl. .................................. 56/328 R; 171/63; 214/356
[58] Field of Search ....................... 56/328 R; 171/63; 214/356

[56] References Cited

U.S. PATENT DOCUMENTS

| | | | |
|---|---|---|---|
| 932,981 | 8/1909 | Goff | 198/496 |
| 2,365,540 | 12/1944 | Fonken | 214/356 |
| 2,539,596 | 1/1951 | Smith | 56/328 R |
| 2,651,902 | 9/1953 | Curry | 56/328 R X |
| 2,812,871 | 11/1957 | Woodall | 214/356 |
| 3,102,647 | 9/1963 | Bonney | 214/356 |
| 3,744,225 | 7/1973 | Reeves | 56/328 R |
| 3,784,037 | 1/1974 | Woodall | 214/356 |
| 3,823,838 | 7/1974 | Gustafson et al. | 214/356 |

Primary Examiner—Russell R. Kinsey
Attorney, Agent, or Firm—Finnegan, Henderson, Farabow & Garrett

[57] ABSTRACT

An apparatus for collecting objects from a surface by grasping the objects between a plurality of discs having resiliently deformable segments. Rotation of the discs with the objects therebetween transports the objects from the surface to a separate portion of the device where they are extracted by arcuate members between the discs and collected.

10 Claims, 5 Drawing Figures

U.S. Patent   March 7, 1978   4,077,194
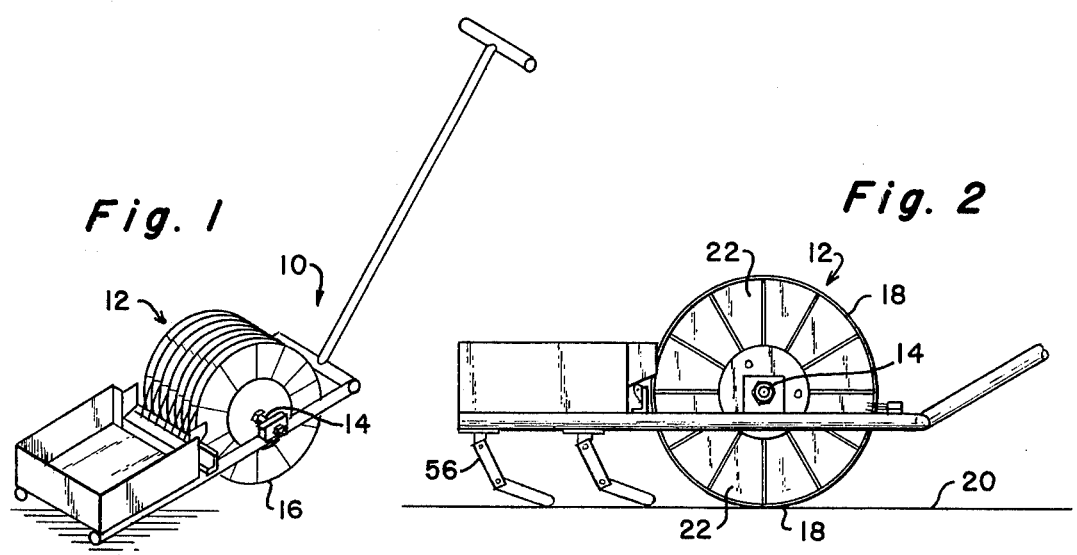
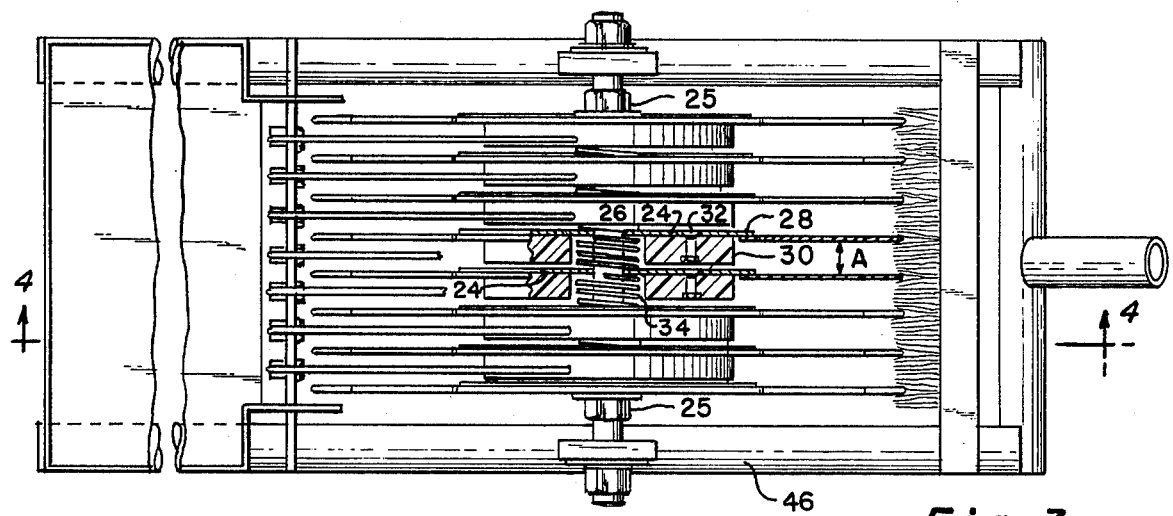
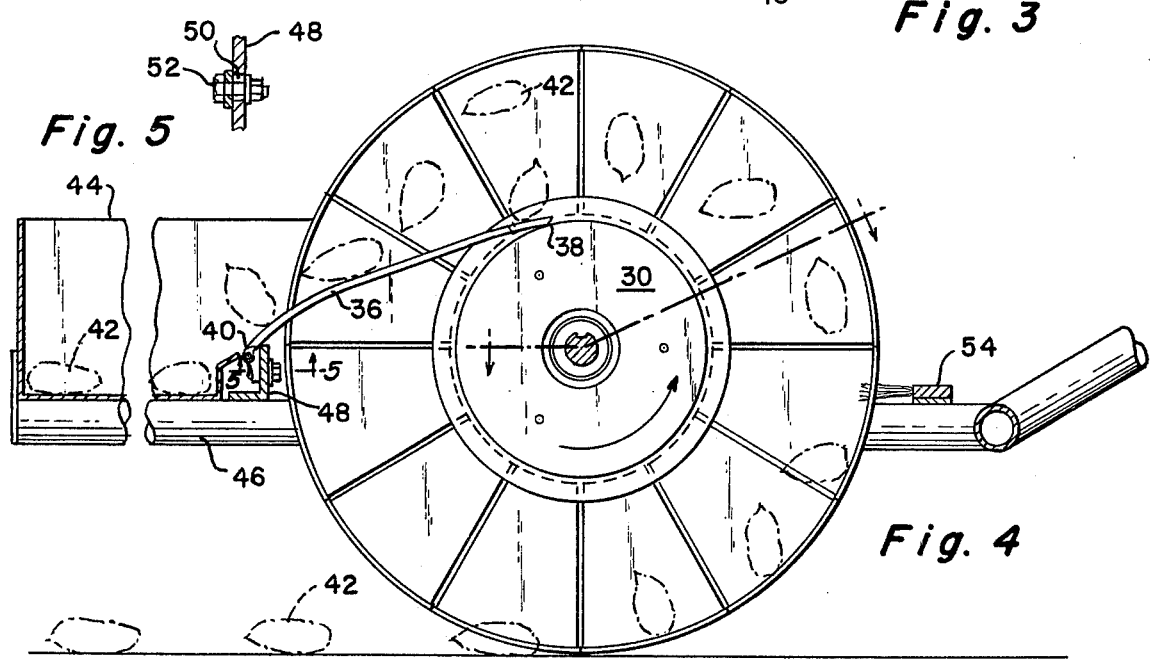

APPARATUS FOR COLLECTING OBJECTS FROM A SURFACE

BACKGROUND OF THE INVENTION

The present invention relates to an apparatus for the collection of objects from a surface.

The collection of objects dispersed about a surface, as for example, nuts or golf balls, is a time-consuming, difficult task to accomplish manually. Consequently, there have been proposed numerous devices for the mechanical collection of objects from a surface. The majority of these devices are complex and cumbersome.

U.S. Pat. No. 2,482,355 to McBride, for example, discloses a collecting device to be attached to the front of a vehicle. The device consists of a pair of cage-like cylindrical components having parallel but axially displaced axes of rotation. The mismatch in the axis of rotation causes one of the cage-like members to disengage objects in the grasp of the other member engaging the objects to be collected. The configuration of the cage-like members of this device, in addition to being complex, results in the device being prone to clogging and the collection of undesirable products from the surface over which the device is passed.

U.S. Pat. Nos. 3,744,255 and 3,613,341 to Reeves, both discloses nut-harvesting machines with a plurality of driven discs. The discs define chambers in which the nuts are retained once placed within the discs.

These references and the prior art in general disclose devices for collecting objects from surfaces that are unduly cumbersome and complex. The complexity of such devices not only makes such devices expensive to manufacture and maintain, but increases the weight of such devices to a degree that when nuts are collected, the device may crush nuts that do not correctly engage with the grasping portion of the device.

Furthermore, where objects of various sizes are to be collected, the presence of a larger object between adjacent discs may force the discs apart to a degree that smaller objects near the larger ones are not retained. By providing a disc with a plurality of segments, this disadvantage of prior art devices is alleviated.

A further advantage of the present invention is the ease of adjustment of the spacing between the adjacent discs. This allows the device to be readily altered to collect different types and shapes of objects or to be adjusted to a spacing that most efficiently engages the objects to be collected.

Further advantages of the present invention will be apparent from the description of the preferred embodiment, or may be learned by practice of the invention.

SUMMARY OF THE INVENTION

In accordance with the purposes of the invention as embodied and broadly described herein, the apparatus of the present invention collects a plurality of objects from a surface by grasping the objects between axially deformable discs and transporting them to a portion of the apparatus where they are collected.

The portion of the device that grasps the objects includes a central shaft substantially parallel to the surface with a plurality of radially disposed discs mounted on the shaft. The peripheral edges of the discs are in contact with the surface from which the objects are to be collected with the discs being separated along a shaft a distance less than the smallest cross-sectional dimension of the objects to be collected. Each of the discs is comprised of a plurality of radially disposed segments deformable in a direction parallel to the shaft to grasp the object between the segments. While the objects are grasped between the segments, they are transported to a different location on the apparatus when the discs are rotated.

The apparatus further includes members between the discs for extracting the objects therefrom during the rotation of the discs. The objects, once extracted, are collected on a separate portion of the apparatus.

Preferably, each of the radially disposed discs is comprised of a central hub mounted on the shaft with mounting on the shaft allowing movement of the hub along the length of the shaft. Resilient members between the discs separate adjacent discs one from the other. The radially disposed segments of the discs are affixed to the outer peripheral edge of the hub with spacers mounted to the hub of a thickness sufficient to substantially fill the space between adjacent discs.

It is also preferred that the individual members between the discs for extracting the objects therefrom each comprise an arcuate member with one extremity of the member adjacent the spacer. The opposite extremity of the arcuate member is affixed to the apparatus outside the peripheral edge of the discs. The arcuate member presents a convex surface to objects between the segments that contact the arcuate member due to the rotation of the discs.

It is also preferred that the apparatus include members affixed to the apparatus preceding the discs for aligning the objects on the surface prior to their contacting the discs. The aligning members orient the objects so the smallest cross-sectional dimension of the objects is parallel to the shaft.

BRIEF DESCRIPTION OF THE DRAWINGS

The accompanying drawings, which are incorporated in and constitute a part of the specification, illustrate several embodiments of the invention and, together with the description, serve to explain the principles of the invention.

OF THE DRAWINGS

FIG. 1 is a perspective view of the apparatus for collecting objects from a surface in accordance with the invention.

FIG. 2 is a side view of the apparatus of FIG. 1 with the optional aligning members disposed beneath the container.

FIG. 3 is an enlarged top view of the present invention illustrating the preferred structure of discs and their attachment to the shaft.

FIG. 4 is a cross-section of the embodiment of FIG. 3 illustrating the grasping of objects between discs.

FIG. 5 is a detailed view of the point of attachment of the arcuate extracting members to the apparatus.

DESCRIPTION OF THE PREFERRED EMBODIMENT

Reference will now be made in detail to the present preferred embodiment of the invention, an example of which is illustrate in the accompanying drawings.

Referring now to FIGS. 1 and 2, it may be seen that the present invention is an apparatus useful for collecting objects from a surface. While the present invention has demonstrated utility for collecting nuts, the objects collected by the apparatus are determined primarily by the spacing of the discs comprising the grasping means and the force applied by the discs to the objects. Objects other than nuts may also be collected by the apparatus of the present invention.

In accordance with the invention, there is provided a plurality of segmented axially resilient discs for grasping objects from a surface. As here embodied and depicted in the figures, the apparatus 10 includes grasping means 12 having a central shaft 14 substantially parallel to the surface. The central shaft supports a plurality of radially disposed discs 16 on the shaft with the peripheral edge 18 of the discs in contact with the surface 20. As depicted in FIG. 3, the discs 16 are separated along the shaft 14 a distance, indicated as A, which is less than the smallest cross-sectional dimension of objects to be collected. The objects, when placed between the discs, force the discs to separate with the force of the discs grasping the objects between the discs as shown in FIG. 4.

The discs 16 are comprised of a plurality of radially disposed segments 22. The segments 22 and, hence, the discs 16 are deformable in a direction parallel the shaft 14 to grasp the objects between the segments. Rotation of the discs 16 transports the objects grasped within the segments as the discs are rotated. The movement of objects grasped between the segments 22 is illustrated by the progress of the objects shown in phantom lines in FIG. 4.

Preferably, each of the radially disposed discs 16 is comprised of a central hub 24 mounted on the shaft 14. It is also preferred that the means of mounting the hub to the shaft allow movement of the hub along the length of the shaft. As depicted in FIG. 3, the hole 26 through the hub 24 is of sufficient clearance about the shaft 14 that the hub, if unrestrained, could move in a direction parallel the longitudinal axis of the shaft. The radially disposed segments 22 of the discs 16 are affixed to the outer peripheral edge 28 of the hub 24.

One means of providing movement of the discs and the associated radially disposed segments is illustrated in FIG. 3 where resilient means, here shown as springs 34, are disposed to separate and space the adjacent discs 16 one from the other. The embodiment depicted has the advantage of providing adjustment spacing of the discs as well as providing some means for altering the force required to separate the discs.

By changing the spring constant of the elastic members interspersed between the discs, the force necessary to place and retain an object between the disc segments can be altered. In addition, by the adjustment of the nuts 25 on the shaft 14, the array of discs can be compressed to reduce the space (A) between the discs.

While the embodiment depicted in FIG. 3 provides for the movement of the discs relative to one another in order to accommodate objects therebetween, other means of providing that movement may also be used. For example, the hubs or the discs could be rigidly affixed to the shaft 14 with the movement of the segments 22 being solely by elastic deformation of the material comprising the segments.

It is also preferred that some means for filling the space at the base of the radially disposed segments is provided and, as depicted in FIG. 3, a spacer 30 is affixed to the hub by means of the bolt 32. It is the function of the spacer to prevent movement of the objects grasped between the radially disposed segments from moving to the interior of the disc adjacent the shaft.

In accordance with the invention, there is also provided means between the discs for extracting the objects therefrom during the rotation of the discs.

As here embodied, and most clearly depicted in FIG. 4, the extracting means comprise an arcuate member 36 having one extremity 38 adjacent the spacer 30. The opposite extremity 40 of the arcuate member 36 is affixed outside the peripheral edge 18 of the discs 16. The arcuate member 36 preferably presents a convex surface to objects 42 between the segments 22, contacting the arcuate member 36 by rotation of the disc 16.

As here embodied, and most clearly depicted in FIGS. 3 and 4, the extremity 40 of the arcuate member 36 is affixed to the apparatus within a container 44. As depicted in FIG. 4, the objects between the discs are rotated within the grasp of the segments 22 and are extracted from between the discs by contact with the arcuate member 36 passing out from between the discs into the container 44. The configuration of the container is illustrative only and while the device may simply retain the objects 42 within a box-like container 44, the objects may be transported by other means (not shown) to a separate portion of the device or completely off the device to ther receiving means.

As depicted herein, the apparatus includes a chassis 46 that supports the shaft 14 as well as providing means on which to attach various components of the apparatus.

Preferably, the arcuate member 36 is pivotally connected to a portion of the chassis allowing rotation of the member 36 in a plane perpendicular to the shaft 14. As depicted in FIG. 4, the arcuate member 36 is affixed to a bracket portion 48 of the chassis, within the container 44. Since the spacing of the discs one from the other is adjustable by compression of the springs 34, it is also preferred that the arcuate members be adjustable in a direction parallel to the shaft 14. As depicted in FIG. 5, the bracket 48 includes an elongated slot 50 into which the fastener 52 holding the extremity 40 of the arcuate member 36 is affixed. The slot allows the arcuate member 36 to be selectively attached to the bracket 48 in various positions relative to the length of the shaft 14.

The present invention is especially useful in the collection of nuts. In such an application the surface from which the nuts are collected includes other materials, such as sticks, weeds, etc., that would adhere to or lodge between the discs, thereby hindering the operation of the device. Therefore, it is preferred that the apparatus include means for cleaning the peripheral edge 18 of the segments 22. One means of cleaning the discs is depicted in FIGS. 3 and 4 which comprises a brush 54 mounted to the chassis of the device with the bristles of the brush contacting the peripheral edge 18 of the segments 22 adjacent to the space therebetween.

It is also preferred that the apparatus include means for aligning the objects 42 with the smallest cross-sectional dimension of the object parallel to the shaft 14. With the spacing (A) between the discs a predetermined relation to the smallest cross-sectional diameter of the objects to be collected, pre-alignment of the objects improves the collection efficiency of the device. Furthermore, once the object is within the grasp of the discs, relation of the object cannot result in a lessening of the grasping force since the smallest dimension of the object is already engaged. As here embodied and depicted in FIG. 2, the apparatus may include a plurality of the guide members 56 for aligning the objects on the surface. The guide members are depicted herein as being affixed beneath the collecting means shown here as collector 44.

OPERATION OF THE DEVICE

As here embodied, the outer peripheral edges 18 of the discs 16 are in contact with the surface 20. As the device 10 is propelled over the surface 20 as shown in FIG. 2, in a direction causing the counter-clockwise rotation of the discs 16, the objects initially contact the guide members 56 (if present) and the discs 16 pass over the objects 42 placing the objects within the spaces between the discs. As shown in FIG. 4, the objects grasped by the disc segments 22, upon further rotation of the discs, transport the objects to a location on the apparatus where they are deflected from between the discs by the arcuate member 36. The objects are then in a position to be retained in the collection means, depicted herein as container 44.

While the embodiment of the invention shown herein is relatively simple, it provides an efficient means of collecting a large number of objects from the surface on which the objects are dispersed. The invention is applicable to the collection of objects of relatively large variations in cross-sectional dimension. The deflection of the discs allows for minor variations in cross-sectional size while the adjustability of the discs along the length of the shaft allows preselection of the size of the objects to be collected.

The invention has been disclosed in terms of a specific embodiment of the invention. One skilled in the art can vary the embodiments disclosed and remain within the scope of the invention as defined by the appended claims.

What is claimed is:

1. An apparatus for collecting objects from a surface comprising:
   a. a chassis;
   b. means for grasping said objects on said surface, said grasping means having a central shaft mounted on said chassis substantially parallel to said surface, a plurality of radially disposed discs on said shaft with the peripheral edge of said discs in contact with said surface, said discs being separated along said shaft a distance less than the smallest cross-sectional dimension of objects to be collected, each of said discs being comprised of a plurality of radially disposed segment, said segments being deformable in a direction parallel to said shaft to grasp the objects between said segments while transporting said objects therebetween when said discs are rotated;
   c. means affixed to said chassis between said discs for extracting said objects therefrom during further rotation of said discs; and
   d. means on said chassis for collecting the extracted objects.

2. The apparatus of claim 1 wherein each of said radially disposed discs is comprised of a central hub mounted on said shaft with the mounting of said hub on said shaft allowing movement of said hub along the length of said shaft, said radially disposed segments of said disc being affixed to the outer peripheral edge of said hub, spacer means mounted to said hub, said spacer means having a thickness sufficient to substantially fill the space between adjacent discs one from the other, said space between adjacent discs being capable of adjustment.

3. The apparatus of claim 2 wherein said apparatus includes means for adjusting the space between adjacent discs.

4. The apparatus of claim 3 wherein said adjusting means comprise means on said shaft for adjustably compressing said resilient means separating adjacent disc.

5. The apparatus of claim 2 wherein said extracting means comprises a curved member having one extremity adjacent said spacer means, the opposite extremity of said curved member being mounted on a stationary portion of said chassis outside the peripheral edge of said discs, said curved member presenting a convex surface to objects between said segments contacting said curved member by rotation of said discs.

6. The apparatus of claim 5 wherein said opposite extremity of said curved member is pivotally connected to a portion of said chassis allowing rotation of said member in a plane perpendicular to said shaft.

7. The apparatus of claim 6 wherein said opposite extremity of said curved member is adjustably mounted to allow adjustment of said member in a direction parallel to said shaft.

8. The apparatus of claim 1 wherein said apparatus includes means for cleaning the peripheral edges of said discs.

9. The apparatus of claim 8 wherein said cleaning means comprise a brush affixed to said chassis with the bristles of said brush contacting said peripheral edge of said discs and projecting into the spaces therebetween.

10. The apparatus of claim 1 including means for aligning said objects on said surface prior to contacting said discs, said aligning means placing the smallest cross-sectional dimension of said objects parallel to said shaft.

* * * * *